United States Patent [19]

Cosares et al.

[11] Patent Number: 5,546,542

[45] Date of Patent: Aug. 13, 1996

[54] METHOD FOR EFFICIENTLY DETERMINING THE DIRECTION FOR ROUTING A SET OF ANTICIPATED DEMANDS BETWEEN SELECTED NODES ON A RING COMMUNICATION NETWORK

[75] Inventors: Steven T. Cosares, Huntington, N.Y.; Iraj Saniee, Berkeley Heights; Ondria J. Wasem, Plainsboro, both of N.J.

[73] Assignee: Bell Communications Research, Inc., Morristown, N.J.

[21] Appl. No.: 158,665

[22] Filed: Nov. 29, 1993

[51] Int. Cl.$^6$ .................................................. G06F 13/00
[52] U.S. Cl. .................. 395/200.21; 370/54; 395/200.13; 395/200.15; 395/858; 364/242.94; 364/242.96; 364/DIG.1; 364/935.51; 364/940.63; 364/DIG.2
[58] Field of Search ..................... 370/16.1, 54, 85.12, 370/95.1; 379/111; 395/200, 800, 200.13, 200.15, 858, 200.21

[56] References Cited

U.S. PATENT DOCUMENTS

| | | | |
|---|---|---|---|
| 4,663,706 | 5/1987 | Allen et al. | 395/200.13 |
| 4,667,287 | 5/1987 | Allen et al. | 395/200.13 |
| 5,067,148 | 11/1991 | Sardana | 379/111 |
| 5,170,482 | 12/1992 | Shu et al. | 395/800 |
| 5,179,548 | 1/1993 | Sandesara | 370/16.1 |
| 5,210,753 | 5/1993 | Natarajan | 370/95.1 |
| 5,293,376 | 3/1994 | White | 370/54 |
| 5,412,652 | 5/1995 | Lu | 370/85.12 |

OTHER PUBLICATIONS

Cosares, Steven, Iraj Saniee, Ondria Wasem. "Network Planning With The SONET Toolkit," *Bellcore Exchange*, pp. 8–9, Sep./Oct. 1992.

Wasem, Ondria J. "An Algorithm For Designing Rings In Communication Networks" Prepared for Bellcore, National Fiber Optic Engineering Conference, Nashville, Apr. 1991.
Liang, Song–Chyau et al., "A Gateway Allocation Algorithm for Interconnecting Existing Data Networks", Infocom '89, pp. 468–473.
Banerjee, Sujata et al., "Order–P: An Algorithm to Order Network Partitionings", SUPERCOMM/ICC '92, pp. 316.6.1–316.6.5.
Wu, Tsong–Ho et al., "A Class of Self–Healing Ring Architectures for SONET Network Applications", IEEE Transactions on Comm., Nov. '92, Vol. 40, No. 11, pp. 1746–1756.
Itai, Alon et al., "Adaptive Source Routing in High–Speed Networks", Israel Symposium on the Theory of Computing and Systems, 1993, pp. 212–221.
Slevinsky, J. B. et al., "An Algorithm for Survivable Network Design Employing Multiple Self–Healing Rings", GLOBECOM '93, pp. 1568–1573.
Shyur, Ching–Chir et al., "A Capacity Comparison for SONET Self–Healing Ring Networks", GLOBECOM '93, pp. 1574–1578.

*Primary Examiner*—Thomas C. Lee
*Assistant Examiner*—Po C. Huang
*Attorney, Agent, or Firm*—Leonard Charles Suchyta; James W. Falk

[57] ABSTRACT

A method for designing a ring communication network is presented. A candidate ring defined by a candidate subset of nodes and a candidate routing is identified. A direction of communication is determined for each of a set of anticipated demands. The cost of operating the ring is calculated based upon the anticipated demands. Finally, the calculated cost is compared to a selected cost threshold to determine if a candidate ring is feasible, wherein the ring communication network comprises the candidate ring.

7 Claims, 4 Drawing Sheets

METHOD FOR EFFICIENTLY DETERMINING THE DIRECTION FOR ROUTING A SET OF ANTICIPATED DEMANDS BETWEEN SELECTED NODES ON A RING COMMUNICATION NETWORK

TECHNICAL FIELD

This invention relates to a method for (a) selecting a ring network which connects a set or subset of nodes of a communication network to maximize the degree of interest between these nodes and (b) a method for determining the direction for routing a set of anticipated demands between the selected nodes on a bidirectional ring network to maximize the total load carried by a selected ring.

BACKGROUND ART

The introduction of high bandwidth services and the development of optical transmission equipment capable of carrying multi-giga bytes of digitized data in seconds have brought about major new considerations in the design of telecommunications networks. While the former demands networks with vastly larger transmission capacities, the latter creates the need for network designs that are considerably more fault-tolerant than the networks in operation today.

The traditional design of facilities networks was principally based on schemes that took advantage of the multiplexing hierarchy to improve the utilization of high bandwidth facilities through hubbing arrangements. Multi-giga byte systems, however, bring the reliability issue to the fore. The failure of one such system or channel at the hub node or link level could result in loss of a considerable percentage of the total demand provisioned in the network, with the concomitant loss of revenues. (See, for instance, the articles in THE NEW YORK TIMES on various outages due to fiber breaks or CO burn outs. "Much Of East Coast Phone Service Is Disrupted By Jersey Cable Break", NEW YORK TIMES, Nov. 19, 1988, p.1, and "AT&T Acting To Thwart New Mass Disruption", NEW YORK TIMES, Nov. 20, 1988, p.37.)

Among the many proposed schemes to make networks survivable, the concept of self-healing ring may be the most promising. In this scheme, network nodes and links that support high bandwidths are connected together on physically diverse closed paths (rings) in such a way that all the traffic that is served by the ring can be recovered in the event of a node or link failure (excluding the traffic originating or terminating at a failed node, which cannot be recovered). The technology that makes this possible is called the Synchronous Optical Network (SONET) standard for optical transmission and the underlying architecture is referred to as a SONET ring. (See G. R. Ritchie, "SONET Lays the Roadbed for Broadband Networks", NETWORKING MANAGEMENT (1990) for more details about the SONET standard).

At present, the SONET transmission standards allow for three distinct survivable ring designs: the (two-fiber) unidirectional ring and the two-fiber and four-fiber bi-directional rings. Depending on the amount of traffic demanded between locations on the ring, the distance between adjacent ring locations, the cost of SONET equipment and the cost of fiber facilities, one of these designs will be most economical.

Among the many new challenging problems in network design that SONET gives rise to, the most immediate is that of determination of the minimum cost survivable ring components. Since the cost of a ring is directly related to its bandwidth/bit rate, this problem is identical to that of minimizing the bandwidth ("load") on each survivable ring sub-component.

In order to select the appropriate ring design for a given situation, one must first determine a candidate topology for the ring over the set of network nodes. Then a potential design must be evaluated based upon how the traffic would be routed. The capacity of the ring is then set to accommodate this traffic and any additional traffic that would be created because of a link or node failure. Once the required capacity for each design is calculated, the associated costs for equipment and facilities can be compared.

The capacity of a SONET ring must be at least as large as the load experienced by any one of the links, should a failure occur. For uni-directional designs, this means that the ring capacity is at least as large as the sum of all of the point-to-point demands that are carried on the ring. For bi-directional ring designs, on the other hand, the required capacity is dependent on how each of the demands is routed on the ring.

Prior art solutions to this problem are inefficient since they require the evaluation of $2^n$ demand routings, where n demands are present. This strategy is, in the best of situations, time consuming, and in even average situations, impossible, given large values of n.

SUMMARY OF THE INVENTION

The general objective of the present invention is to efficiently determine the set or subset of nodes in a network and the loading of the demands between the nodes on a bidirectional ring network which require the least capacity, so that equipment and facility costs associated with the design are minimized.

One specific object of the present invention is to efficiently determine an economical ring communication network defined by a subset of nodes and a routing therebetween.

Another specific object of the present invention is to provide a method for determining the respective directions for routing a series of demands on a bidirectional ring communication network.

In carrying out the present invention, a method is provided for determining the direction of communication between source and destination node pairs of a bidirectional ring communication network having a plurality of nodes, wherein each source and destination node pair has an anticipated demand having a magnitude, the anticipated demands being stored in a memory device.

The method includes the steps of retrieving the anticipated demands from a memory device and utilizing the processor to sort the anticipated demands in order of the magnitudes of the demands to obtain a sorted list.

The processor is then used to calculate from the sorted list a quantity representative of a required ring capacity of an associated ring network in conjunction with assigned directions for one or more of the other anticipated demands, each calculation being performed for the clockwise and counter-clockwise direction for each anticipated demand. Finally, the processor is used to fix the direction for each demand based upon the ring capacities calculated for each direction.

Moreover, a method is provided for determining the direction of communication between source and destination node pairs of a bidirectional ring communication network having a plurality of nodes and links which connect successive nodes, wherein each source and destination node pair has an anticipated demand having a magnitude, the anticipated demands being stored in a memory device.

The method includes the step of retrieving the anticipated demands from the memory device. Further, a processor is utilized to perform a dual ascent procedure based on linear programming to determine the direction for each demand based upon a dual objective function.

In addition, a method for determining the direction of communication between source and destination node pairs of a bidirectional ring communication network is provided wherein the communication network has a plurality of nodes, and wherein each source and destination node pair has an anticipated demand having a magnitude, the anticipated demands being stored in the memory device, and wherein each pair of successive nodes on the ring network define a link.

The method includes the steps of retrieving the anticipated demands from the memory device and utilizing a processor to calculate a plurality of weighting constants, each weighting constant corresponding to a respective link in the ring network.

The processor is further used to assign a routing for each anticipated demand based upon a comparison of a sum of the weighting constants for the links which comprise a counterclockwise routing of the anticipated demand and a sum of the weighting constants for the links which comprise a clockwise routing of the anticipated demand. The processor then calculates a link load for each link based upon the magnitudes of the demands which use each link and calculates a dual objective function value based upon a product of the link load and the respective weighting constant for each respective link.

The processor increments the weighting constant corresponding to a first link connected to a selected node by an incremental constant, the first link having a higher sum of the anticipated demands which originate or terminate from the selected node as compared with the sum of the demands for a second link which originate or terminate at the selected node, and decrementing the weighting constant of the second link by a decremental constant. The processor repeats each of the four previous steps a selected number of times.

Further, a method is provided for determining a ring communication network defined by a subset of nodes and a routing therebetween in a communication network having a plurality of nodes and a plurality of source and destination node pairs, wherein each source and destination node pair has an anticipated demand, the anticipated demands being stored in the memory device, and wherein each pair of successive nodes on the ring network define a link.

The method includes the steps of retrieving the anticipated demands from the memory device and utilizing a processor to identify a candidate ring defined by a candidate subset of nodes and a candidate routing therebetween.

The processor is also used to determine a direction of communication between the source and the destination node pairs which constitute the candidate ring and calculate a cost of operating the ring based upon the anticipated demands. Further, the processor is used to compare the calculated cost to a selected cost threshold to determine if the candidate ring is feasible wherein the ring communication network comprises the candidate ring.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Ring Loading—Problem Definition

To formally state the Ring Loading problem (RL) and fix notation, let R denote a ring network with node set, $\{1, \ldots, n\}$ and link set, $\{(1,2), (2,3), \ldots, (n-1, n), (n, 1)\}$. For each (non-negative integer) demand, $d_k$, k=1, ... D, let $i_k$ and $j_k$, where $i_k<j_k$ denote the originating and terminating nodes, respectively. For each of exposition, we may index a demand by its endpoints, e.g. (i,j).

For bi-directional ring designs, the demand between nodes i and j, i<j, could either be assigned to a path in the ring in the clockwise direction (which is denoted by the sequence, $\{i, (i,i+1), i+1, \ldots, j-1, (j-1,j)\ j\})$, or in the counter-clockwise direction (which is denoted by the sequence, $\{j, (j,j+1), J+1, \ldots, n, (n,1), 1, \ldots, i-1, (i-1,i), i\})$. We assume that the ring designs do not allow any single demand to be split between the two directions. However, it is possible that two distinct demands having the same origin and destination nodes be routed in different directions. If a node or link in the ring experiences a failure, the demands that are affected are re-directed to avoid the failed location.

Figure 1:
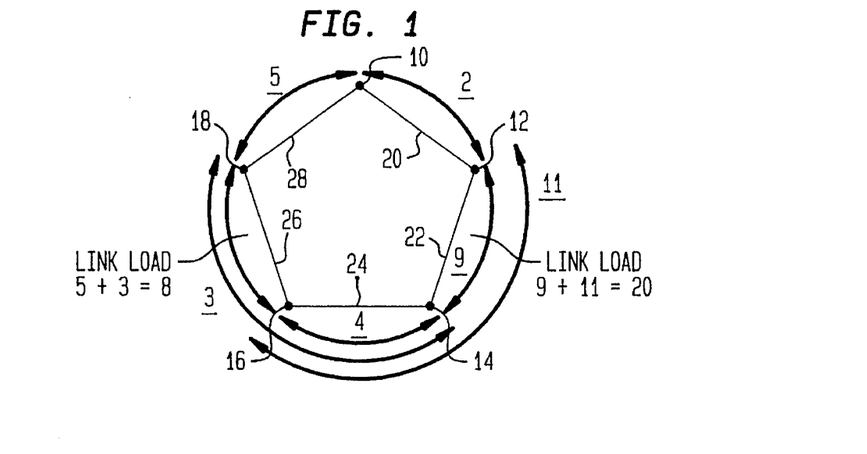
FIG. 1 represents a sample ring network shown in association with a set of anticipated demands as well as corresponding link loads.

Turning now to FIG. 1, a sample ring network is shown in association with a set of anticipated demands. The ring communication network has five nodes, node 1 being labelled 10, node 2 being labelled 12, node 3 being labelled 14, node 4 being labelled 16 and node 5 being labelled 18. These nodes are connected by five links 20, 22, 24, 26 and 28. A sample set of anticipated demands for this ring network are given in the table below.

| | Demands | |
|---|---|---|
| i | j | d (i,j) |
| 1 | 2 | 2 |
| 1 | 4 | 5 |
| 2 | 3 | 9 |
| 2 | 4 | 11 |
| 3 | 4 | 4 |
| 3 | 5 | 3 |

As FIG. 1 illustrates, once a direction is selected for each of the demands, every link on the ring will be incident to some subset of the demands. We define the "load" on each link to be the total demand incident to it. Thus, the load on link 26 is the sum of the demands incident to that link, specifically the demand from node 1 to node 4 with a magnitude of 5 and the demand from node 3 to node 5 with a magnitude of 3 yielding a link load of 8. Similarly, the load for link 22 is found by summing the demands incident to that link yielding a link load of 20.

The ring design must have sufficient capacity to accommodate the loads assigned to every one of its links. That is, the capacity must be at least as large as the maximum of the link loads. Since the cost of a ring increases with its capacity, it is desirable to route the demands so as to minimize the required capacity.

The Ring Loading problem (RL) is stated as follows: Given a set of n nodes on a ring and a set of D demands between pairs of nodes, find a direction for each of the demands so that the maximum of the loads on the links on the ring is as small as possible.

The decision variables for the problem are associated with whether a particular demand should be routed in a clockwise or counter-clockwise direction. Formulated as such, there are $2^D$ possible solutions to the Ring Loading problem. Let $$x_k^+$$

be a $\{0,1\}$ variable that indicates whether demand k is routed in a clockwise direction. Similarly, $$x_k^-$$

is a $\{0,1\}$ variable that indicates whether demand k is routed in a counter-clockwise direction. Let the variable z represent the required ring capacity associated with a solution.

The Ring Loading problem is formulated as follows:

Minimize Z $$s.t. \; x_k^+ + x_k^- = 1, \quad k=1,\ldots,D \quad (1)$$

$$z \geq \sum_{k \in K_1(1)} d_k x_k^+ + \sum_{k \in K_2(1)} d_k x_k^- \; l = 1,\ldots,n \quad (2)$$

$$x_k^+, x_k^- \in 0,1$$

where $K_1(1)=\{k|i_k \leq 1 \leq j_k-1\}$ and $K_2(1)=\{k|j_k \leq 1 \text{ or } 1<i_k\}$.

Constraint set (1), in conjunction with the integrality constraints, states that each demand is routed in one of the clockwise or counter-clockwise direction. Constraint set (2) states that z, the optimal capacity of the ring, must be at least as large as the load on each of the links. For link (l, l+1) the load is the sum of the $d_k$ for clockwise routed demands between nodes i and j such that $i \leq l \leq j-1$, and counter-clockwise routed demands between nodes i and j such that $j \leq l$ or $i>l$.

The Ring Loading problem with the integrality constraints on the x variables relaxed corresponds to the case where the splitting of demands is allowed. This problem can be formulated as a Linear Program and could therefore be solved in polynomial time (L. G. Khachiyan, "A Polynomial Algorithm in Linear Programming", SOVIET MATH. DOKL. (1979) 191–194). However, when demand splitting is not allowed, as is the case for the ring designs being studied here, the problem is NP-Complete. The proof of this is as follows.

Consider an arbitrary case of the Partition problem, which has been shown to be NP-Complete in R. M. Karp, "Reducibility Among Combinatorial Problems," in COMPLEXITY OF COMPUTER COMPUTATIONS, Plenum Press (1972) 85–103, (see also M. R. Garey and D. S. Johnson, COMPUTERS AND INTRACTABILITY: A GUIDE TO NP-COMPLETENESS, W. H. Freeman, San Francisco, Calif. (1979)). The problem statement is as follows: Given m items with integer sizes $s_1,\ldots,s_m$, is there a partition of the items into sets $A_1$ and $A_2$ such that $$\sum_{i \in A_1} S_i = \sum_{j \in A_2} S_j.$$

By casting this problem as the following instance of the Ring Loading problem, we show that the Ring Loading problem is NP-Complete as well. Consider a ring with two nodes numbered 0 and 1. Let $d_k=S_k$, k=1 . . . m, where Orig(k)=0 and Term(k)=1 for all k. Any feasible solution to the Ring Loading problem must partition the demands to visit either link (0,1) or link (1,0). The corresponding load on the ring, therefore, is at least $$ŝ=½\Sigma s_i.$$

If the optimal solution to the Ring loading problem is equal to ŝ, then we can conclude that the answer to the Partition problem is YES. Otherwise, the answer must be NO.

Ring Loading—Solution

Since the Ring Loading problem is inherently difficult and it would be impractical to examine each of the $2^D$ potential solutions in order to find a reasonable loading, the following set of heuristics can be used to find solutions to the problem.

The simplest method to find a solution to the problem is to route each demand $d_k$ with origin node i and destination node j in the direction which has the smaller number of links, i.e., the smaller of j–i and n–(j–i), where ties are broken arbitrarily. This could be accomplished in O(D) time. However, it is easy to construct examples where this simple heuristic leads to link loads that are several times larger than the minimum.

Another solution technique, which we refer to as a one-phase greedy method, entails first ranking the demands in non-increasing order of $d_k$, which requires O(D log D) time. Then, the largest demand is routed in the direction which uses the minimum number of links, as above. The remaining demands, however, are routed in the direction which would result in the smallest incremental change in required ring capacity. As with the above algorithm, ties are broken arbitrarily. This approach usually results in ring capacities that are superior to those generated by the previous algorithm.

The solution associated with this greedy approach might have been improved if the largest demand had been routed in a different direction than was originally selected. Because it was routed first, its impact on the ring capacity was the same, whether it was routed in the clockwise or counter-clockwise direction. An improvement to the algorithm, which we refer to as a two-phase greedy heuristic, is to route the largest demand in a clockwise direction, then continue with the greedy algorithm. That solution is compared with the one associated with routing the largest demand in a counter-clockwise direction. The solution requiring the lesser ring capacity is selected.

Figure 2A:
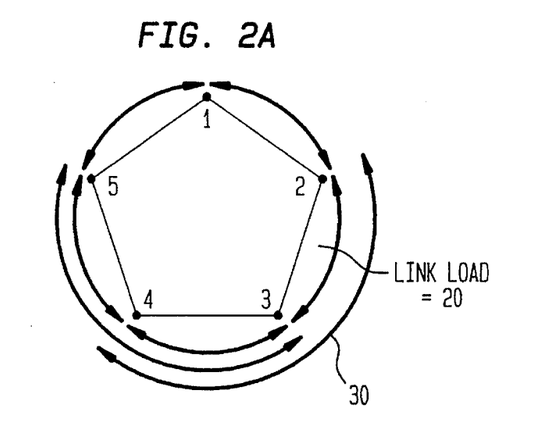
FIGS. 2a and 2b represent the progression of one embodiment of the present invention.
Figure 2B:
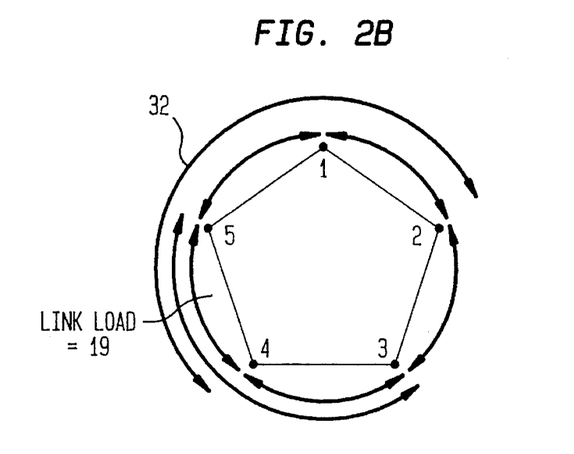

An illustration of this method is present in FIGS. 2a and 2b. FIG. 2a represents a ring network consisting of five nodes labelled 1–5 with an assigned routing for each of the sample demands shown in the table below. Note that the ring capacity is governed by the maximum link load which is 20 occurring for the link connecting nodes 2 and 3.

| | Demands | |
|---|---|---|
| i | j | d (i,j) |
| 1 | 2 | 2 |
| 1 | 4 | 5 |
| 2 | 3 | 9 |
| 2 | 4 | 11 |
| 3 | 4 | 4 |
| 3 | 5 | 3 |

Turning to FIG. 2b, the direction of the demand between nodes 2 and 4 in FIG. 2a is represented in FIG. 2b. The ring capacity which results if the demand between nodes 2 and 4 is routed in a counter-clockwise direction, and the direction of the remaining demands are chosen as dedicated by the greedy technique, has a value of 19. Any other tie arising in the greedy algorithm could have also been treated this way.

The two-phase greedy scheme is described as follows:

Step 1: List the demands in non-increasing order.

Step 2: For each demand on the list:
Check which routing of the demand (clock-wise or counter-clockwise) increments the required ring capacity by a smaller amount. Fix the routing for the demand accordingly, unless there is a tie.
If there is a tie, then:
Use the one-phase greedy scheme to determine the ring capacity associated with the remaining demands where this demand is routed in a counter-clockwise direction (with the current load on each link preserved).
Use the one-phase greedy scheme to determine the ring capacity associated with the remaining demands where this demand is routed in a clock-wise direction (with the current load on each link preserved).
Select the routing for this demand that is associated with the smaller ring capacity.

Notice that the branching in Step 2 is always performed once at the beginning (when there are no current loads) and possibly a few more times, when there are additional ties. Since there can be no more than $O(D)$ such ties, the complexity of this technique is no more than $O(D^2)$.

The dual ascent approach to solving the Ring Loading problem exploits the linear relaxation of the integer programming formulation (RL) and its associated dual linear program, namely:

$$(DRL): \text{Maximize} \sum_{K=1}^{D} d_k y_k$$

$$s.t. \sum_{l=1}^{n} w_l = 1$$

$$y_k = MIN \left( \sum_{l=i}^{j-1} w_l, \sum_{l=j}^{n} w_l + \sum_{l=1}^{i-1} w_l \right),$$

$$k = (i,j), k = 1 \ldots D$$

The $y_k$ variables represent the shadow prices for the constraints in set (1) in RL. That is, they measure the sensitivity of the optimal load to the amount demanded between each node pair in D. The $w_l$ variables, which are associated with constraint set (2) in RL, measure the sensitivity on a per-link basis.

By linear programming duality, any feasible solution to DRL, i.e., any set of non-negative values $w_l$, lll, $w_n$, whose sum is 1, provides a lower bound to optimal solution of RL.

Such a bound could be used within a Branch and Bound scheme to solve the Ring Loading problem, or could alternatively be used to measure the quality of some feasible loading generated by approaches like the one described in Section 4. In either case, an objective is to find a set of values for $w_l$ which give as large a value as possible to the associated objective function in DRL, without expending too much computational effort.

The dual ascent approach works to find acceptable values for $w_l, \ldots, w_n$ by starting with some feasible assignment (say $w_l=1/n$, l=1 . . . n), and successively changing the assignment in a way that increases the value of the objective function, $\Sigma d_k y_k$, until some stopping criteria are met. The approach has been successfully applied in a variety of applications, including facility location (O. Bilde and J. Krarup, "Sharp Lower Bounds and Efficient Algorithms for the Simple Plant Location Problem", ANNALS OF DISCRETE MATHEMATICS 1 (1977) 79–97, D. Erlenkotter, "A Dual-Based Procedure for Uncapacitated Facility Location", OPERATIONS RESEARCH 26 (1978) 992–1009), network design (A. Kalakrishnana, T. L. Magnanti, and R. T. Wong, "A Dual-Ascent Procedure for Large Scale Network Design", OPERATIONS RESEARCH 37 (1989) 716–740), and database location (M. L. Fisher and D. S. Hochbaum, "Database Location in Computer Networks", JOURNAL OF THE ACM 27 (1980) 718–735). It is often possible to use the values from an iteration of a dual ascent scheme to generate a reasonable solution to the original integer programming problem (see, e.g., R. T. Wong, "Dual Ascent Approach for Steiner Tree Problems on a Directed Graph", MATHEMATICAL PROGRAMMING 28 (1984) 271–287).

The following scheme, based on the dual ascent scheme, is very effective for generating good feasible solutions to the Ring Loading problem, Step 0: Choose a feasible set of values for the w variables, e.g., $w_i=1/n$, i=1 . . . n.

Step 1: For all k=1 . . . D, calculate $Y_k = \min(\lambda_1^k, \lambda_2^k)$, where $$\lambda_1^k = \sum_{l=i_k}^{j_k-1} w_l \text{ and } \lambda_2^k = \sum_{l=j_k}^{n} w_l + \sum_{l=1}^{i_k-1} w_l.$$

Step 2: Assign a routing for each demand:

Dual Objective Value = $\sum_k d_k y_k$

If $\lambda_1^k \leq \lambda_2^k$ then route demand $d_k$ clockwise.

If $\lambda_1^k < \lambda_2^k$ then route demand $d_k$ counter-clockwise.

Step 3: Calculate the link loads associated with this routing.

If the associated capacity requirement for the ring is smaller than that of the incumbent solution, this solution becomes the new incumbent.

Step 4: If the stopping criteria are not yet met, update $w_l, \ldots, w_n$ as follows: Select a "pivot" node i. Led $d_1$ be the sum of the demands originating/terminating at node i that are routed toward node i+1. Let $d_2$ be the sum of the demands originating/terminating at node i that are routed toward node i−1.

If $d_1 < d_2$ then set $w_i = w_i + \delta$, $w_{i-1} = w_{i-1} - \delta$, where $0 \leq \delta \leq w_{i-1}$.

If $d_1 > d_2$ then set $w_i = w_i - \delta$, $w_{i-1} = w_{i-1} + \delta$, where $0 \leq \delta \leq w_i$.

Repeat from Step 1.

During each iteration, a set of routings are determined that are based on the values of $w_1, \ldots, w_n$ and the complementary slackness conditions for optimality of DRL, i.e., $$y_k < \lambda_1^k \text{ implies } X_k^+ = 0 \, y_k < \lambda_2^k \text{ implies } X_k^- = 0.$$

After a predetermined number of iterations, or when an optimum for DRL is found, the algorithm stops and the best routing thus far encountered is chosen. (The running time of the algorithm is 0(D) for each iteration.)

For a particular selection for values of $\delta$, the above algorithm is such that the dual objective at each iteration is at least as large as that of its previous iterate (e.g., it is an ascent algorithm). We point out that the ring capacity requirement associated with the routings generated by these iterates do not necessarily exhibit the same monotonic behavior. Hence, the necessity to maintain an incumbent solution.

Notice that from one iteration to the next; the only w variables whose values change are $w_i$ and $w_{i-1}$, where i is the "pivot" node selected. Consequently, the only y variables affected are those associated with demands that either originate or terminate at node i. In order to maintain the non-negativity of the $w_i$, the value of $\delta$ is bounded. For a small enough value of $\delta$, the dual objective value increases by $|(d_1 - d_2) \times \delta$.

A potential selection criteria for the pivot node, therefore, is to choose the one that generates the greatest increase in the dual objective. We point out, however, that early convergence to an optimal solution of the dual would tend to terminate the generation of new routing solutions. Such would hinder the effectiveness of the dual ascent scheme. Furthermore, one may intentionally select pivot nodes and values for $\delta$ which do not result in successive increases in the objective value in the hope of obtaining routings that are superior to those generated by strict adherence to a dual ascent scheme. Since any node could serve as a pivot node, one may also choose a scheme which selects them at random with encouraging results.

Figure 3A:
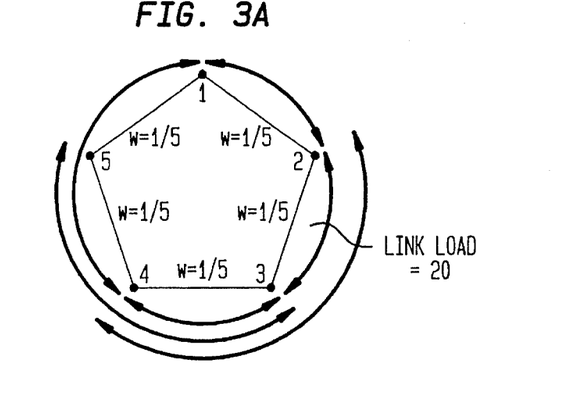
FIGS. 3a, 3b and 3c represent the progression of an alternative embodiment of the method of the present invention.
Figure 3B:
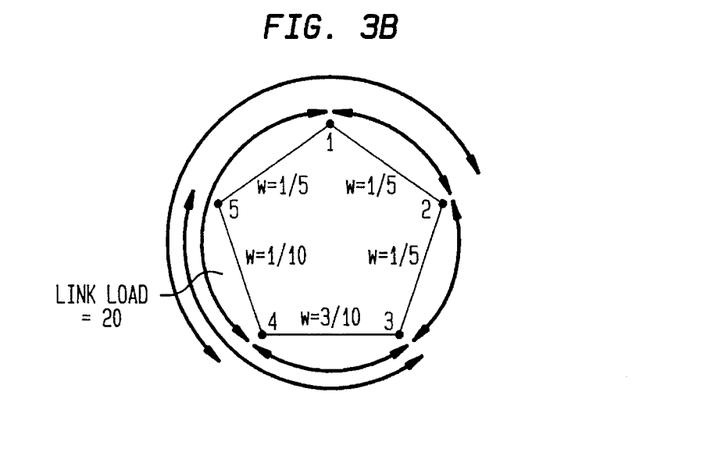
Figure 3C:
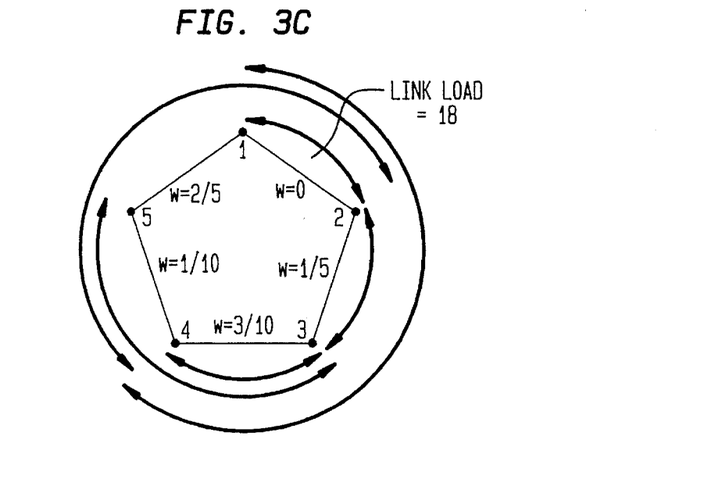

The example in FIGS. 3a, 3b and 3c illustrate a descent or ascent scheme which selects pivot nodes arbitrarily and during each iteration chooses $\delta$ to be the largest value such that non-negativity of w is maintained and no more than one demand is rerouted.

FIG. 3a represents a first iteration on the problem of determining the routing for a series of demands given in the table below for a five node ring network shown. The values of the w variables are initially set to equal values. The ring capacity is governed by the maximum link load of 20 which occurs between nodes 2 and 3. The value of the dual objective function for this particular configuration is 10.6.

FIG. 3b illustrates a second iteration corresponding to the case where node 4 is chosen as the pivot node and a $\delta$ value of 1/10 is chosen. The ring capacity for this configuration is 19 which is governed by the link load of the link connecting nodes 4 and 5. The value of the dual objective function for this configuration is 11.6.

FIG. 3c illustrates a third iteration of the algorithm. Node 1 is chosen as the pivot node and the value of $\delta$ is chosen to be 1/5. The ring capacity for this configuration is 18 governed by the link load of the link connecting nodes 1 and 2. The value of the dual objective function for this configuration is 12.2.

| Demands | | |
|---|---|---|
| i | j | d (i,j) |
| 1 | 2 | 2 |
| 1 | 4 | 5 |
| 2 | 3 | 9 |
| 2 | 4 | 11 |
| 3 | 4 | 4 |
| 3 | 5 | 3 |

The choices of nodes 4 and 1 as pivot nodes are for illustrative purposes. Choosing any other pivot nodes would have also resulted in increases in the dual objective, but would have given rise to a different routing. Notice that in iteration 2, the value of $\delta$ was selected so that the sum of the $w_i$ between nodes 2 and 4 is equal to ½. A larger value for $\delta$ would have yielded a smaller increase in the dual objective. (We point out, for the sake of completeness, that the solution could be further improved by re-routing the demand between nodes 1 and 2. However, there are no values for w which would yield that solution).

A set of runs of the one-phase greedy, two-phase greedy, and dual ascent schemes using randomly selected data have been completed so that preliminary comparisons between the methods and the optimum value could be made. The average of the loads arising from ten runs, using randomly selected demands being between 5 and 100, is presented for varying ring sizes and varying demand densities (i.e. average number of demands per node). The tables below represent the results of these runs.

| SIZE (n,D) | ONE-PHASE GREEDY | TWO-PHASE GREEDY | DUAL ASCENT | OPTIMAL SOLUTION |
|---|---|---|---|---|
| (5,6) | 150.2 | 150.2 | 151.7 | 149.7 |
| (10,12) | 310.6 | 303.0 | 313.9 | 281.6 |
| (15,25) | 546.0 | 537.1 | 504.9 | 478.3 |
| (20,40) | 829.6 | 791.1 | 711.1 | 686.5 |
| (25,60) | 1219.0 | 1152.3 | 1070.9 | 1027.7 |
| (30,90) | 1722.7 | 1667.0 | 1490.7 | 1423† |
| (5,8) | 203.9 | 195.7 | 180.2 | 179.5 |
| (10,23) | 519.4 | 508.8 | 468.9 | 431.6 |
| (15,50) | 1036.3 | 1004.8 | 883.1 | 863.5 |
| (20,95) | 1844.8 | 1754.3 | 1502.6 | 1463.5 |
| (25,150) | 2980.6 | 2833.8 | 2339.2 | 2321.1 |
| (30,200) | 3807.7 | 3692.9 | 3115.3 | 3041.6† |
| (5,10) | 224.0 | 224.0 | 199.6 | 199.0 |
| (10,45) | 919.4 | 869.6 | 768.2 | 729.1 |
| (15,105) | 1972.9 | 1930.1 | 1596.7 | 1584.0 |
| (20,190) | 3572.1 | 3454.5 | 2810.3 | 2786.4† |
| (25,300) | 5643.8 | 5446.2 | 4390.0 | 4356.2† |
| (30,435) | 7998.9 | 7776.9 | 6211.5 | 6106.2† |

†For some of these instances a tight bound was used when an optimal solution could not be easily obtained.

The results point out that the dual ascent scheme is an excellent approach to solving the Ring Loading problem, particularly for instances where the ring has a high demand density. In addition to providing lower bounds, the approach gives solutions that are superior to those obtained by the greedy algorithms. Furthermore, even in the largest of these examples, reasonable solutions (within 6% of the optimum) were obtained after relatively few (about 100) iterations within milliseconds of CPU time on a Motorola 8840DP.

From whichever context the ring loading problem arises, it solves a significant subproblem which is to help determine a minimum cost for each survivable ring design, given the demands that are to be carried by that sub-network. As such, this problem directly answers the question of whether or not survivable rings are economically viable in the design of telecommunications transport networks.

In addition to being used for the comparison of different SONET ring designs, the ring loading problem discussed above has also arisen in the processes of designing survivable telecommunications transport networks. In that context, there are a number of additional problems that need to be solved. For example, the ring designs being discussed here are well suited to a set of locations having a high community of interest, (i.e., the nodes have much demand with each other). In the design of a communication network having a plurality of nodes, such sets of nodes need to be selected. Then the possibility of including some or all of these nodes on a ring (or physically diverse paths) needs to be investigated. The algorithm for ring loading can then be used as a subroutine within a branch and bound scheme or as part of a relaxation-based method for the mathematical programming problem formulation of the underlying network design problem.

Ring Selection—Problem Definition

The problem of identifying sets of nodes for forming a ring can be formulated as a large scale integer programming problem, R. We begin with the following definitions:

K=set of commodities 1, ..., K with 0(k)=origin and D(k)=destination of commodity k.

$C_{pp}^{(\cdot)}$=cost of point-to-point system for set of nodes (.).

$C_{RG}^{(\cdot)}$=cost of "cheapest" ring amongst all types allowed for set of nodes(.).

$x_k=1$ if demand for commodity k on ring.

$x_k=0$ if demand for commodity k not on ring.

The goal is to select the one ring that maximizes the savings over the alternative point-to-point solution. The objective function is written as follows:

R:

$$\max_{x_k=0,1} \left\{ [c_{pp}(d_1x_1,\ldots,d_Kx_K) - C_{RG}(d_1x_1,\ldots,d_Kx_K)]x\frac{\sum_{k=1}^{K}d_kx_k}{\sum_{k=1}^{K}d_k} \right\}$$

s.t. a cycle through $\{0(k), D(k); \forall k, x_k=1\}$ exists.

Ring Selection—Problem Solution

Since it is not feasible to do any kind of exhaustive search in order to determine a good topology for a specific potential network, a heuristic approach to find suitable rings has been developed. This algorithm is greedy in that it looks for a good ring as a partial solution, and, if successful, is left with a reduced problem. This procedure is iterated until it can find no additional good rings. The remainder of this section describes the motivation and methodology for a specific heuristic algorithm.

Some properties of rings that have been found to be efficient both functionally and economically are noted below.

There are usually some nodes that the ring passes through (i.e., potential splicing and/or regenerator locations) but that don't contribute to the ring's traffic. These are known as "through nodes," as opposed to the "ADM sites," at which ADMs (Add-Drop Multiplexors) will be placed, and which will contribute to the ring's traffic.

The number of links between adjacent ADM sites on a ring (lower bound of one) is seldom more than a very small integer, say two or three, in the transport network. It is often larger in the access network. We use the term "hop limit" to serve as an upper bound for this property. By not permitting solutions that exceed this value, we substantially reduce our search space while being unlikely to miss many good solutions.

The number of regenerators is very small, often zero.

The number of ADM sites on a ring is bounded both by hardware considerations (physical limit on the number of add/drop multiplexors allowed on bidirectional rings) and by the allowable ring rates (i.e., the demand of a pair of ADM sites cannot exceed the traffic carrying capacity of the ring operating at the highest rate).

The problem formulation assumes the availability of input data consisting of node and link information, traffic demand, types and costs of multiplexors and regenerators, a user-defined hop limit, physical constraints such as the number of multiplexors allows on a ring, the regenerator distance threshold, etc. The potential network graph consisting of all nodes and links has been checked for "two connectivity," the mathematical property that guarantees that there are at least two diverse paths between each pair of nodes. If this condition has not been met, the user can supply additional links. Otherwise, the network is decomposed into "blocks," each of which is two-connected. It will NOT be possible to provide diverse routing paths between nodes in different blocks and, as a direct consequence, no ring can contain nodes in different blocks. Thus, the algorithm works on a single block at a time.

Any demands that equal or exceed the highest transmission rate available are not suitable for rings, because any ring links over which these demands are routed cannot be shared with other demands. Such high demands will usually be routed as direct point-to-point connections with appropriate protection. Demands that are close to this limit get similar treatment.

One embodiment of the present invention requires that all traffic between a given pair of sites be routed the same way. This may not be efficient for fiber and equipment costs but it presumably minimizes the operations and maintenance costs. It would be easy to modify the algorithm so that a large demand could be split with each part routed independently of the other. For example, if the highest rate was OC-48 and some pair of sites had a traffic demand of 60 DS3s, we could assign 48 of the DS3s to an OC-48 point-to-point routing and leave the remaining 12 DS3s to be routed as the algorithm warrants. The latter scenario probably would give better fiber and equipment utilization but would complicate the operations and maintenance aspects.

The heuristic ring algorithm is based on the notion of a "Community of Interest", or COI. The basic requirements are that the ADM sites have sufficient demand amongst themselves (based on a threshold that the user provides, it could even be zero) and that they be in geographical proximity. The latter condition can be defined using actual link distances, the hop limit, or some combination of both. Of course, there are other necessary conditions for creating a ring, in addition to COI. The algorithm must be able to route a ring through the selected nodes without reusing any link, the ring must be capable of handling the traffic between all of the selected node pairs, the limit to the number of nodes permitted on a ring must be obeyed, etc.

Figure 4:
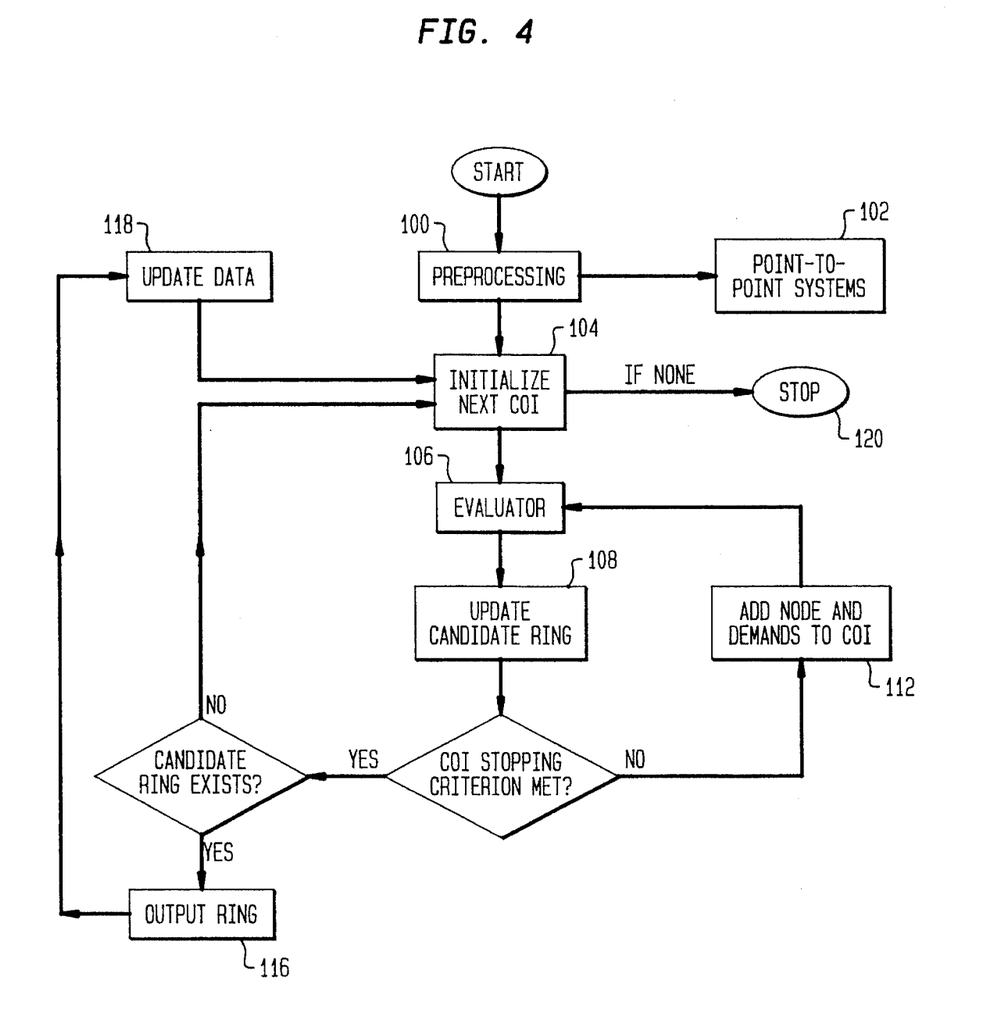
FIG. 4 represents a flow chart representation of a high level view of the ring selection algorithm of the present invention.

Turning now to FIG. 4, a high level view of the ring selection algorithm is presented. A preprocessing is performed in step 100 which includes decomposing the network into two-connected blocks and providing point-to-point connections for the very high demands, as described above. Next, the algorithm finds COIs which will make economic rings. The next COI is initialized in block 104 by choosing the two nodes that have the largest demand between them and that also pass a proximity test. As the algorithm runs, this COI will be augmented by finding the node that has the most traffic to the nodes already present in the COI. For this node to be included, it must pass the proximity requirements and it must also be possible to build an acceptable ring through the nodes in the COI. It is possible to build an acceptable ring through the nodes if a cycle through the nodes which does not exceed the hop limit exists, and the highest ring rate can carry all of the traffic. (A cycle is a physical path in the network that closes on itself, with each node having only two neighbors on the cycle). An algorithm for finding a cycle through the nodes is described in Wasem, O. J., "An Algorithm For Designing Rings In Survivable Fiber Networks," IEEE TRANSACTIONS ON RELIABILITY, Vol. 40, NO. 4, Oct. 1991, pp. 428–432.)

For each COI that is determined, the cost of putting the demands between the nodes in the COI on a ring is compared to a benchmark cost to determine whether the ring is economical. The ring cost is determined by the evaluator shown in step 106 which chooses the least cost of three ring alternatives: unidirectional, 2-fiber bidirectional, and 4-fiber bidirectional. It also chooses the least cost routing of the demands for the bidirectional rings. The benchmark to which the ring cost is compared is the cost of providing point-to-point connections for the demands, providing diverse protection for the protected demands. We chose this architecture as the benchmark for two reasons. First, it is an architecture that might be used as the alternative to a ring. Second, it provides the same level of protection as the ring would for the protected demands.

After the evaluator runs, the candidate ring is updated in step 108. Initially, there is no candidate ring. If the cost of the ring just evaluated is less than the benchmark cost and there is no candidate ring, that ring becomes the candidate ring. If there already is a candidate ring, then the algorithm determines if the current ring/COI combination produces the greatest savings of all rings found so far, for COIs produced from the same initial COI. If it does produce the greatest savings, the ring becomes the new candidate ring. The algorithm then iterates, trying to add more nodes to the COI, as shown in step 112. Eventually, the process terminates when the maximum allowable number of nodes or the highest ring rate capacity is reached. If a candidate ring/COI exists, it will be part of the solution as is shown in step 116. The demands carried by the ring are removed from the demand data in step 118 and we have a reduced problem (same nodes and links but a smaller set of demands). The algorithm is applied to the reduced problem. This heuristic procedure terminates in step 120 when no economical ring can be found.

Turning now to FIG. 4, a flow chart representation of the high-level operation of the algorithm is presented.

Turning to the preprocessing step 100, the network is divided into two-connected blocks. Any demands for which the origin and destination nodes are on different blocks will not be protected. The ring selection algorithm works on one block at a time, treating only demands for which both endpoints are contained in the block.

The demands are ordered according to decreasing size. All demands (demand refers to a capacity required between two nodes) greater than a selected threshold are carried on a point-to-point system as in block 102. If the demand requires protection, a diverse route is supplied. The threshold can be tuned to be most efficient for the problems at hand. For instance, if 80% utilization is desirable, then the threshold can be 80% of the highest rate used.

For the remaining demands, when two or more demands have the same size, they are ordered according to increasing number of links on the shortest path between the origin and destination nodes of the demand. If two or more demands are the same size and have the same number of links between the endpoints, then the demands are ordered according to increasing distance of the shortest path between the endpoints of the demands. Finally, if there is still a tie, the demands are ordered lexically according to node name of the endpoints. (This assumes that there is at most one demand per pair of nodes).

Turning now to initializing step 104, a COI is initialized by choosing the next demand in the list that has not yet been used to initialize a COI. The demands are ordered by the preprocessing in block 100.

Figure 5:
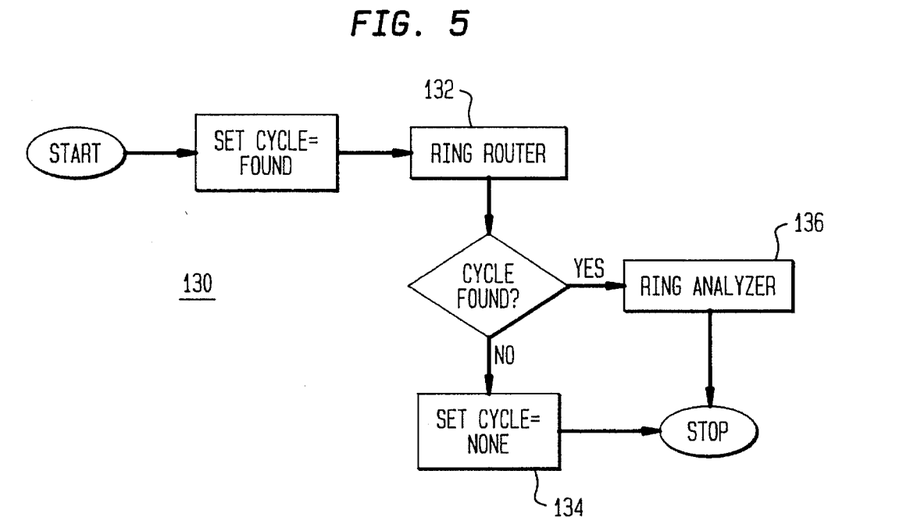
FIG. 5 represents a flow chart representation of the evaluator step of the ring selection algorithm of one embodiment of the present invention.

The evaluator of step 106 is shown in more detail in FIG. 5. Before a ring is priced by the Ring Analyzer, a variable CYCLE is set to "found" as shown in step 130. A ring router algorithm described in Wasem, O. J., "An Algorithm For Designing Rings In Survivable Fiber Networks," IEEE TRANSACTIONS ON RELIABILITY, Vol. 40, No. 4, October 1991, pp. 428–432, is then run as shown in step 132. The ring router finds a cycle containing all of the nodes in the COI, if such a cycle exists. The cycle found must meet the hop limit. If there is no cycle, the evaluator indicates that by setting the flag CYCLE to "none" as shown in step 134. If there is a cycle, the ring analyzer, as previously described, is run as shown in step 136. Note that any cycle finding algorithm could be used in the evaluator.

The ring analyzer finds the least-cost ring of any type containing the nodes and demands of the COI. The cost of the ring includes the costs of ADMs, regenerators, and fiber. (Structure cost is not included, as it is shared among all systems that use a particular link). The cost, type and demand routing are stored in a data structure. Note that any algorithm for costing rings could be used in the evaluator.

The candidate ring is the ring that has been found for the current initial COI that saves the most money over the benchmark architecture. Any architecture which would be used in place of a ring is a valid benchmark architecture. Updating the candidate ring is shown in more detail in step 108 in FIG. 6. If no cycle had been found by the ring router, the update algorithm stops, as shown in step 150. The benchmark architecture assumed for the purpose of this description is the point-to-point architecture, with diverse protection for demands that required protection. For each demand, a point-to-point system (with diverse protection) is built using the shortest path (and second-shortest path) between the origin and destination nodes. The cost of the system includes the costs of the terminal multiplexors, regenerators, and fiber. The sum of the costs of all point-to-point systems required to carry all of the demands for the COI is the benchmark cost, computed as shown in step 152.

Figure 6:
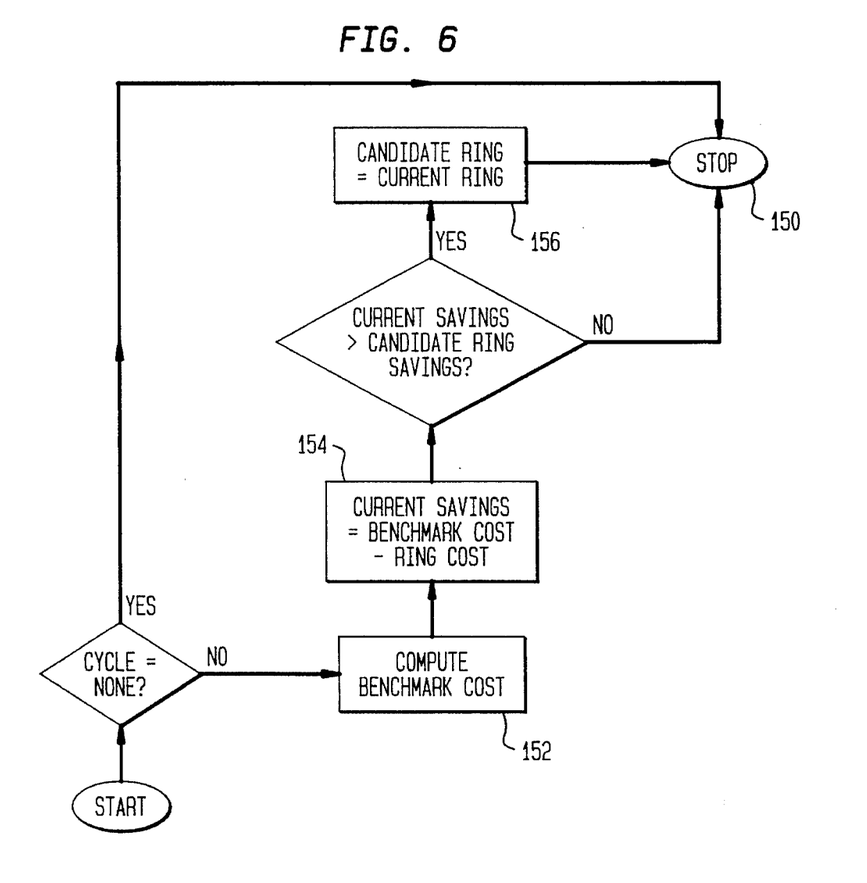
FIG. 6 represents a flow chart representation of the step of updating the candidate ring of the ring selection algorithm of one embodiment of the present invention.

The current savings is calculated as shown in step 154 as the difference between the benchmark cost and the current ring cost. If the savings obtained by building the current ring exceeds the savings obtained by building the candidate ring, then the current ring becomes the candidate ring as shown in step 156 and the procedure ends with step 158. (If there is no candidate ring, then the current ring savings is compared to zero). If the current savings does not exceed the candidate ring savings, the procedure ends in step 150.

The COI stopping criterion of FIG. 4 is determined as follows. An upper bound on the number of ADM sites allowed per ring is an input to the algorithm. Since the SONET standard limits bidirectional rings to 16 ADM sites, 16 is commonly used as an upper bound. If the current COI contains a number of nodes equal to the upper bound, and no candidate ring exists, then a new COI is initialized. If the current COI contains a number of nodes equal to the upperbound, and a candidate ring does exist, then that candidate ring is output, and the data defining the problem is updated, as shown in step 118. If the current COI contains a number of nodes less than the upperbound, then the COI is augmented as shown in step 112.

Turning now to step 112 of FIG. 4, the next node added to the COI must meet the hop limit, meaning that the shortest path between it and at least one of the nodes already in the COI must meet the hop limit. Among all nodes meeting the hop limit, the next node added to the COI is the one that has the most demand to the COI. The demand between a node and a COI is defined as the sum of all of the demands between the node and each node of the COI. If two or more nodes meeting the hop limit have the same demand to the COI, then the one that is fewest hops (links) from the COI is added. If two or more nodes have the same demand to the COI and are the same number of hops from the COI, then the one that is closest in distance (along the shortest path) to the COI is chosen. If two or more nodes qualify under all three criteria, then the nodes are chosen in order according to their names.

Turning now to step 118 of FIG. 4, each time a ring is output, all demands carried on that ring (i.e. all demands between pairs of ADM sites on the ring) are deleted from the list of demands. This leaves a smaller problem at each iteration.

While the best mode for carrying out the invention has been described in detail, those familiar with the art to which this invention relates will recognize various alternative designs and embodiments for practicing the invention as defined by the following claims.

What is claimed is:

1. A method for operating a computer system to determine the direction of routing of communication demands between source and destination node pairs on a bidirectional ring network having a plurality of nodes to minimize the capacity required for the communication demands, said computer system having a processor and a memory device, the method comprising the steps of:

retrieving the anticipated demands from the memory device;

calculating a plurality of weighting constants, each weighting constant corresponding to a respective link in the ring network;

assigning a routing for each anticipated demand based upon a comparison of a sum of the weighting constants for the links which comprise a counterclockwise routing of the anticipated demand and a sum of the weighting constants for the links which comprise a clockwise routing of the anticipated demand;

calculating a link load for each link based upon the magnitudes of the demands which use each link;

calculating a dual objective function value based upon a product of the link load and the respective weighting constant for each respective link; and incrementing the weighting constant corresponding to a first link connected to a selected node by an incremental constant, the first link having a higher sum of the anticipated demands which originate or terminate from the selected node as compared with the sum of the demands for a second link which originate or terminate at the selected node, and decrementing the weighting constant of the second link by a decremental constant.

2. The method of claim 1 further including the step of maximizing the dual objective function.

3. The method of claim 1 wherein the decremental constant is the negative absolute value of the incremental constant.

4. The method of claim 1 wherein the sum of the weighting constants is 1.

5. A method for operating a computer system to group together links between source nodes and destination nodes into a bidirectional ring network wherein each source node and destination node pair has an anticipated demand, said computer system having a processor and a memory device coupled to said processor and wherein said anticipated demand magnitudes are stored in said memory device, the method comprising the steps of:

retrieving the anticipated demands from said memory device, and calculating the cost of building the ring network based upon the anticipated demands with different directions of communication between source and destination node pairs using a dual ascent procedure.

6. The method of claim 5 wherein the dual ascent procedure includes the steps of:

calculating a plurality of weighting constants, each weighting constant corresponding to a respective link in the ring network;

assigning a routing for each anticipated demand based upon a comparison of a sum of the weighting constants for the links which comprise a counterclockwise routing of the anticipated demand and a sum of the weighting constants for the links which comprise a clockwise routing of the anticipated demand;

calculating a link load for each link based upon the magnitudes of the demands which use each link;

calculating a dual objective function value based upon a product of the link load and the respective weighting constant for each respective link; and incrementing the weighting constant corresponding to a first link connected to a selected node by an incremental constant, the first link having a higher sum of the anticipated demands which originate or terminate from the selected node as compared with the sum of the demands for a second link which originate or terminate at the selected node, and decrementing the weighting constant of the second link by a decremental constant.

7. The method of claim 5 further comprising the steps of identifying a candidate ring defined by a candidate subset of nodes and a candidate routing therebetween, said calculating step calculating the cost of building the candidate ring, and comparing the calculated cost to a selected cost threshold to determine if the candidate ring is feasible.

* * * * *